Patented Jan. 8, 1929.

1,698,659

UNITED STATES PATENT OFFICE.

OSKAR SPENGLER, OF NEUBABELSBERG-BERGSTUCKEN, AND ALFRED THURM, OF DESSAU IN ANHALT, GERMANY.

TANNING MATERIAL.

No Drawing. Application filed February 25, 1927, Serial No. 171,062, and in Germany February 23, 1926.

It is known that when the esters of salicylic acid are sulphonated they are split into their components by the action of the water produced by the reaction. For example according to Cohn (Journal für praktische Chemie, 61, page 545) the phenyl ester or naphthyl ester of salicylic acid is easily hydrolyzed by concentrated sulphuric acid, there being produced phenolsulphonic acid or naphtholsulphonic acid respectively and salicylic acid or sulpho-salicylic acid according to the conditions of reaction:

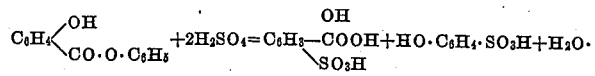

The salicylides, disalicylides, tetrasalicylides and polysalicylides, which are internal esters of salicylic acid, yield sulphosalicylic acid with concentrated sulphuric acid (compare German specification No. 134,234).

The anhydride of para-hydroxybenzoic acid is converted by concentrated or fuming sulphuric acid into para-hydroxysulpho-benzoic acid (Journal für praktische Chemie, 28, page 194).

According to the present invention new products are obtained by sulphonating esters of hydroxyaryl-carboxylic acids in such a manner that hydrolysis by the water produced in the reaction is prevented as far as possible. For this purpose there is selected as sulphonating agent one which has a tendency itself to react with the water produced and the usual procedure is so far varied that the sulphonating mixture is added to the ester to be sulphonated with avoidance of excess. Suitable sulphonating agents are chlorosulphonic acid, pyrosulphuric acid, fuming sulphuric acid and other mixtures. These sulfonating agents belong to the class which may be defined as capable of chemically reacting with water.

Purification of the ester or separation of the esterifying agent is not always necessary in carrying out the reaction. The process may be extended to the condensation products obtainable as described in U. S. Letters Patent No. 1,550,589 and the application for a Patent Ser. No. 106,551 of May 3rd, 1926, which contain i. a. esters of hydroxy-arylcarboxylic acids. The condensation products obtained according to these processes may be subjected further to a special treatment with sulphonating agents of the kind named above. The operation may also be conducted in such a manner that the condensation is effected by means of a smaller proportion of hydroxy-arylcarboxylic acid sulphochloride than is necessary for obtaining completely water-soluble products, and then the product of this treatment may be subjected to the action of the sulphonating agent, as stated above, until it has become soluble in water.

The products obtained in accordance with this invention are similar to those described in U. S. Letters Patent No. 1,550,589 and the application for a patent Ser. No. 106,551 of May 3rd, 1926, in that they are in general hygroscopic bodies of resinous character, brittle at room temperature, which dissolve easily in water to colloidal solutions. Alkali metal salts precipitate resinous sticky masses from the solutions and these masses dissolve again on dilution.

The products are tanning agents of very good properties. They precipitate strong gelatine and convert animal skins into white, or more or less coloured, leather, of good fullness and soft in high degree. By suitable purification of the products their properties become even better.

The following examples illustrate the invention, the parts being by weight:

*Example 1.*—To 21 parts of salol chlorosulphonic acid is added drop by drop, while stirring, at 140°–160° C. The mass is at first limpid and becomes bright yellow, then thickens and acquires a red yellow colour. Hydrogen chloride is liberated during the reaction. The addition of the chlorosulphonic acid is stopped as soon as a sample of the mass dissolves clearly in water. This is the case after the addition of 13–16 parts of the chlorosulphonic acid.

There is obtained a yellow red, resinous, hygroscopic mass which is plastic at the temperature of the reaction but at room temperature is brittle enough to be easily comminuted. It dissolves very easily in water to a red solution.

*Example 2.*—Instead of salol there is used the 2-naphthol ester of salicylic acid. For 26.4 parts of this ester 10-13 parts of chlorosulphonic acid are required; there is obtained a brown mass which dissolves in water to a red brown solution having a red fluorescence.

*Example 3.*—To 19 parts of acetylsalicylic acid are added at 160-170° C. 10-12 parts of chlorosulphonic acid. The deep dark yellow brittle mass thus obtained dissolves easily in water to a dark yellow solution.

*Example 4.*—26 parts of a salicylosalicylic acid are sulphonated at 150-170° C. with 11-13 parts of chlorosulphonic acid. The feebly yellow, brittle product dissolves in water to a colourless solution having a slight opalescence.

*Example 5.*—In a vessel provided with a stirrer and a reflux condenser, 14 parts of salicyclic acid are melted and there are dropped into the molten mass while stirring, 12 parts of thionyl chloride. As soon as the thionyl chloride has been consumed, 3 parts of fuming sulphuric acid of 65 per cent strength are gradually added at 150-170° C. The feebly yellow product dissolves easily in water.

If the proportion of thionyl chloride used in making the salicylide is increased or if the proportion of the fuming sulphuric acid used in the sulphonation is diminished, the product obtained is not hygroscopic and does not dissolve easily in water until the latter is hot and then does not separate again on cooling.

*Example 6.*—For the salicylic acid used in Example 5 there are substituted 15 parts of a mixture of the 3 homosalicylic acids obtainable from crude cresol. The cresotides become soluble in water after addition of about 5 parts of chlorosulphonic acid. The properties of the product are similar to those of the product of Example 5.

*Example 7.*—A mixture of 14 parts of salicylic acid, 6 parts of toluene and 6 parts of phosphorus oxychloride is boiled for 1-2 hours until the phosphorus oxychloride has been used up. The toluene is distilled and the temperature is raised to 160° in order that it may be completely separated. There are then dropped into the mass at 170-190° C. 4-5 parts of chlorosulphonic acid until a sample dissolves clearly in water.

There is obtained a strongly hygroscopic yellow-red, brittle mass which dissolves to a rose solution in water. The colour becomes brighter by action of a reducing agent.

*Example 8.*—A mixture of 15 parts of salicylic acid suphochloride and 6 parts of β-naphthol is heated while stirring. At 160-170° C. the reaction begins accompanied by foaming and liberation of hydrogen chloride. After the mass has been thoroughly stirred, 1-2 parts of fuming sulphuric acid of 65 per cent strength are added. The greenish black product dissolves in water to a greenish-brown solution.

*Example 9.*—25 parts of cresotinic acid sulphochloride are heated with 16 parts of salicylic acid to 165-175° C. until evolution of hydrogen chloride ceases and the limpid mass begins to thicken. The product, which is only incompletely soluble in water, is made completely soluble by addition of about 6 parts of chlorosulphonic acid.

*Example 10.*—In the manner described in Example 9, 4 parts of salicylic acid sulphochloride are melted with 5 parts of polysalicylide and the mass is made soluble in water by a sulphonation with about 1 part of chlorosulphonic acid at 170-180° C.

It is obvious to all skilled in the art that the invention is not limited to the foregoing examples or to the details given therein.

The term "ester", when used in connection with hydroxy-aryl-carboxylic acid in this specification and claims, is intended to denote compounds of hydroxy-aryl-carboxylic acids in which either the hydroxyl group is esterified with an organic carboxylic acid, or the carboxylic group is esterified with an organic hydroxy compound, or both the hydroxyl and carboxylic group are thus esterified, or any mixture of such compounds.

What we claim is:

1. The process which comprises subjecting an ester of a hydroxy-aryl-carboxylic acid compound to the action of a sulfonating agent capable of chemically reacting with water until a sample of the reaction product dissolves in water.

2. The process which comprises subjecting an ester of a cresotinic acid to the action of a sulfonating agent capable of chemically reacting with water until a sample of the reaction product dissolves in water.

3. The process which comprises subjecting an ester of a hydroxy-aryl-carboxylic acid compound to the action of chlorosulfonic acid until a sample of the reaction product dissolves in water.

4. The process which comprises subjecting an ester of a cresotinic acid to the action of chlorosulfonic acid until a sample of the reaction product dissolves in water.

5. As new products tanning materials which in their dry state are more or less hygroscopic substances of resinous character, readily soluble in water to colloidal solutions precipitated as resinous sticky masses by the addition of alkali metal salts which masses redissolve on dilution, said products being substantially identical with the products obtainable by subjecting an ester of a hydroxy-aryl-carboxylic acid to the action of chlorosulfonic acid until a sample of the reaction product dissolves in water.

6. As new products tanning materials which in their dry state are more or less hygroscopic substances of resinous character, readily soluble in water to colloidal solutions precipitated as resinous sticky masses by the addition of alkali metal salts which masses redissolve on dilution, said products containing in their composition at least one methyl group attached to an aryl nucleus and being substantially identical with the products obtainable by subjecting an ester of a cresotinic acid to the action of chlorosulfonic acid until a sample of the reaction product dissolves in water.

In testimony whereof we affix our signatures.

OSKAR SPENGLER.
ALFRED THURM.